(12) United States Patent
Childress et al.

(10) Patent No.: US 10,377,481 B2
(45) Date of Patent: Aug. 13, 2019

(54) SYSTEMS AND METHODS TO LAUNCH AIRCRAFT

(71) Applicant: The Boeing Company

(72) Inventors: James J. Childress, Mercer Island, WA (US); Daniel J. Perron, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 1124 days.

(21) Appl. No.: 13/662,269

(22) Filed: Oct. 26, 2012

(65) Prior Publication Data
US 2014/0117153 A1 May 1, 2014

(51) Int. Cl.
*B64F 1/04* (2006.01)
*B64C 39/02* (2006.01)

(52) U.S. Cl.
CPC .............. *B64C 39/024* (2013.01); *B64F 1/04* (2013.01); *B64C 2201/08* (2013.01); *B64C 2201/208* (2013.01)

(58) Field of Classification Search
CPC .......... B64F 1/04; B64F 1/06; B64C 2201/08; B64C 2201/208
USPC ........................................ 244/63, 115, 172.9
See application file for complete search history.

(56) References Cited

U.S. PATENT DOCUMENTS

| | | | | |
|---|---|---|---|---|
| 1,748,500 A * | 2/1930 | Thaden | .......................... | 244/115 |
| 1,756,747 A * | 4/1930 | Holland | ..................... | B64F 1/04 244/110 F |
| 1,802,254 A * | 4/1931 | Holland | ..................... | B64F 1/04 244/110 R |
| 2,062,599 A * | 12/1936 | North | ................................. | 244/2 |
| 2,234,750 A * | 3/1941 | Fleet et al. | ....................... | 244/63 |
| 2,286,381 A * | 6/1942 | Rubissow | ................. | B64F 1/04 244/63 |
| 2,331,837 A * | 10/1943 | King | .......................... | B64F 1/10 244/63 |
| 2,413,723 A * | 1/1947 | Maxson | ..................... | B64F 1/06 244/63 |
| 2,418,702 A * | 4/1947 | Du Pont | .......................... | 244/63 |
| 2,659,553 A * | 11/1953 | Wallis | ............................. | 244/63 |
| 2,734,702 A * | 2/1956 | Northrop et al. | .......... | B64F 1/10 104/248 |
| 2,843,020 A * | 7/1958 | Bertagna et al. | ............ | 89/1.819 |

(Continued)

FOREIGN PATENT DOCUMENTS

EP 2218642 A2 8/2010

OTHER PUBLICATIONS

Extended European Search Report for European Application No. 13189774.6, dated Feb. 27, 2014; 5 pages.

(Continued)

*Primary Examiner* — Richard R. Green
(74) *Attorney, Agent, or Firm* — Toler Law Group, PC

(57) ABSTRACT

Systems and methods to launch an aircraft are disclosed. In one embodiment, a system to launch an aircraft comprises a launch arm comprising at least one load cell, an aircraft coupled to the launch arm, and a release mechanism in communication with the at least one load cell, wherein the release mechanism releases the aircraft when the at least one load cell indicates that a load on the launch arm is below a predetermined threshold. Other embodiments may be described.

20 Claims, 4 Drawing Sheets

(56) References Cited

U.S. PATENT DOCUMENTS

| | | | | |
|---|---|---|---|---|
| 3,038,383 | A | * | 6/1962 | Von Tiesenhausen .... F41F 3/04 89/1.806 |
| 3,224,336 | A | * | 12/1965 | Eddins .................... F41F 3/052 89/1.806 |
| 3,415,156 | A | * | 12/1968 | Burcham ................ F41F 3/052 89/1.806 |
| 3,452,949 | A | * | 7/1969 | Bassett .................... B64B 1/40 244/31 |
| 3,962,951 | A | * | 6/1976 | Schenk ................... F41F 3/077 403/326 |
| 3,989,206 | A | * | 11/1976 | Gregory .................... B64F 1/06 124/6 |
| 4,012,988 | A | * | 3/1977 | Knight .................... F41F 3/052 403/322.3 |
| 4,016,796 | A | * | 4/1977 | Brannan ................. F41F 3/052 403/2 |
| 4,523,729 | A | * | 6/1985 | Frick ........................ B64F 1/04 244/115 |
| 4,622,639 | A |   | 11/1986 | Adelson |
| 4,687,158 | A | * | 8/1987 | Kettering ........................ 244/63 |
| 5,695,153 | A | * | 12/1997 | Britton ..................... B64F 1/04 124/63 |
| 6,648,273 | B2 |  | 11/2003 | Anast |
| 7,210,654 | B1 | * | 5/2007 | Cox ...................... B64C 39/024 244/190 |
| 7,472,866 | B2 | * | 1/2009 | Heaston ................... B63G 8/28 244/63 |
| 7,665,691 | B2 | * | 2/2010 | Hanzlick .................. B64F 1/10 244/63 |
| 8,387,920 | B2 | * | 3/2013 | Grabmeier ............... B64D 1/12 244/137.3 |
| 8,740,134 | B2 | * | 6/2014 | Suzuki ................... B64C 37/02 244/110 F |
| 8,955,801 | B2 | * | 2/2015 | McGeer ................. B64C 25/68 244/110 C |
| 2007/0084965 | A1 | * | 4/2007 | Lipponen ........................ 244/63 |
| 2008/0111021 | A1 | * | 5/2008 | Toth ........................ B63G 8/28 244/63 |
| 2009/0146002 | A1 | * | 6/2009 | Lovette .................. A63H 27/14 244/63 |
| 2009/0242693 | A1 | * | 10/2009 | Urnes, Sr. ........................ 244/63 |
| 2011/0062281 | A1 | * | 3/2011 | Woolley et al. ................ 244/63 |
| 2011/0113605 | A1 | * | 5/2011 | Plaza Baonza ......... B64G 1/222 24/603 |
| 2011/0209602 | A1 | * | 9/2011 | Grabmeier ............... B64D 1/12 89/1.51 |
| 2012/0080556 | A1 | * | 4/2012 | Root, Jr. ........................ 244/63 |
| 2014/0091177 | A1 | * | 4/2014 | McGeer ................. B64C 25/68 244/110 F |
| 2014/0203136 | A1 | * | 7/2014 | Endres ............................ 244/50 |
| 2014/0203137 | A1 | * | 7/2014 | Endres ............................ 244/63 |
| 2014/0203140 | A1 | * | 7/2014 | McGeer ................. B64C 25/68 244/110 F |
| 2014/0252162 | A1 | * | 9/2014 | Teller ............................. 244/63 |

OTHER PUBLICATIONS

Examination Report, The Arab States of the Gulf, Application No. GC 2013-25464, dated Feb. 28, 2017, 3 pages.

Examination Report of the Arab States of the Gulf dated Sep. 29, 2017, for Application No. GC 2013-25464, 4 pgs.

Examination Report of the Arab States of the Gulf for Application No. GC 2013-25464, dated Jun. 25, 2018, 5 pgs.

* cited by examiner

SYSTEMS AND METHODS TO LAUNCH AIRCRAFT

BACKGROUND

The subject matter described herein relates to systems and methods to launch aircraft.

Aircraft, particularly smaller autonomous and semi-autonomous aircraft such as surveillance drones, blimps, and quad rotors, may be launched from ground-based launch platforms. Weather conditions and wind may complicate launch operations for such aircraft.

SUMMARY

In one embodiment, a system to launch an aircraft comprises a launch arm comprising at least one load cell, an aircraft coupled to the launch arm, and a release mechanism in communication with the at least one load cell, wherein the release mechanism releases the aircraft when the at least one load cell indicates that a load on the launch arm is below a predetermined threshold.

In another embodiment, an aircraft comprises a fuselage, a thrust generator, one or more control surfaces, a flight control system, wherein the flight control system receives feedback from at least one load cell on a launch arm and adjusts the thrust generator and the one or more control surfaces on the aircraft and a release mechanism to release the aircraft from the launch arm when a load measured by the at least one load cell on the launch arm falls below a predetermined threshold.

In another embodiment, a method to launch an aircraft comprises coupling an aircraft to a launch arm comprising at least one load cell, pivoting the launch arm between a first position in which the launch arm is stowed and a second position in which the launch arm is deployed, adjusting a thrust generator and one or more control surfaces on the aircraft; and releasing the aircraft from the launch arm when the at least one load cell indicates that a load on the launch arm is below a predetermined minimum.

Further areas of applicability will become apparent from the description provided herein. It should be understood that the description and specific examples are intended for purposes of illustration only and are not intended to limit the scope of the present disclosure

BRIEF DESCRIPTION OF THE DRAWINGS

Embodiments of methods and systems in accordance with the teachings of the present disclosure are described in detail below with reference to the following drawings.

DETAILED DESCRIPTION

Systems and methods to launch an aircraft are described herein. Specific details of certain embodiments are set forth in the following description and the associated figures to provide a thorough understanding of such embodiments. One skilled in the art will understand, however, that alternate embodiments may be practiced without several of the details described in the following description.

The invention may be described herein in terms of functional and/or logical block components and various processing steps. For the sake of brevity, conventional techniques related to data transmission, signaling, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description may refer to components or features being "connected" or "coupled" or "bonded" together. As used herein, unless expressly stated otherwise, "connected" means that one component/feature is in direct physical contact with another component/feature. Likewise, unless expressly stated otherwise, "coupled" or "bonded" means that one component/feature is directly or indirectly joined to (or directly or indirectly communicates with) another component/feature, and not necessarily directly physically connected. Thus, although the figures may depict example arrangements of elements, additional intervening elements, devices, features, or components may be present in an actual embodiment.

Figure 1:
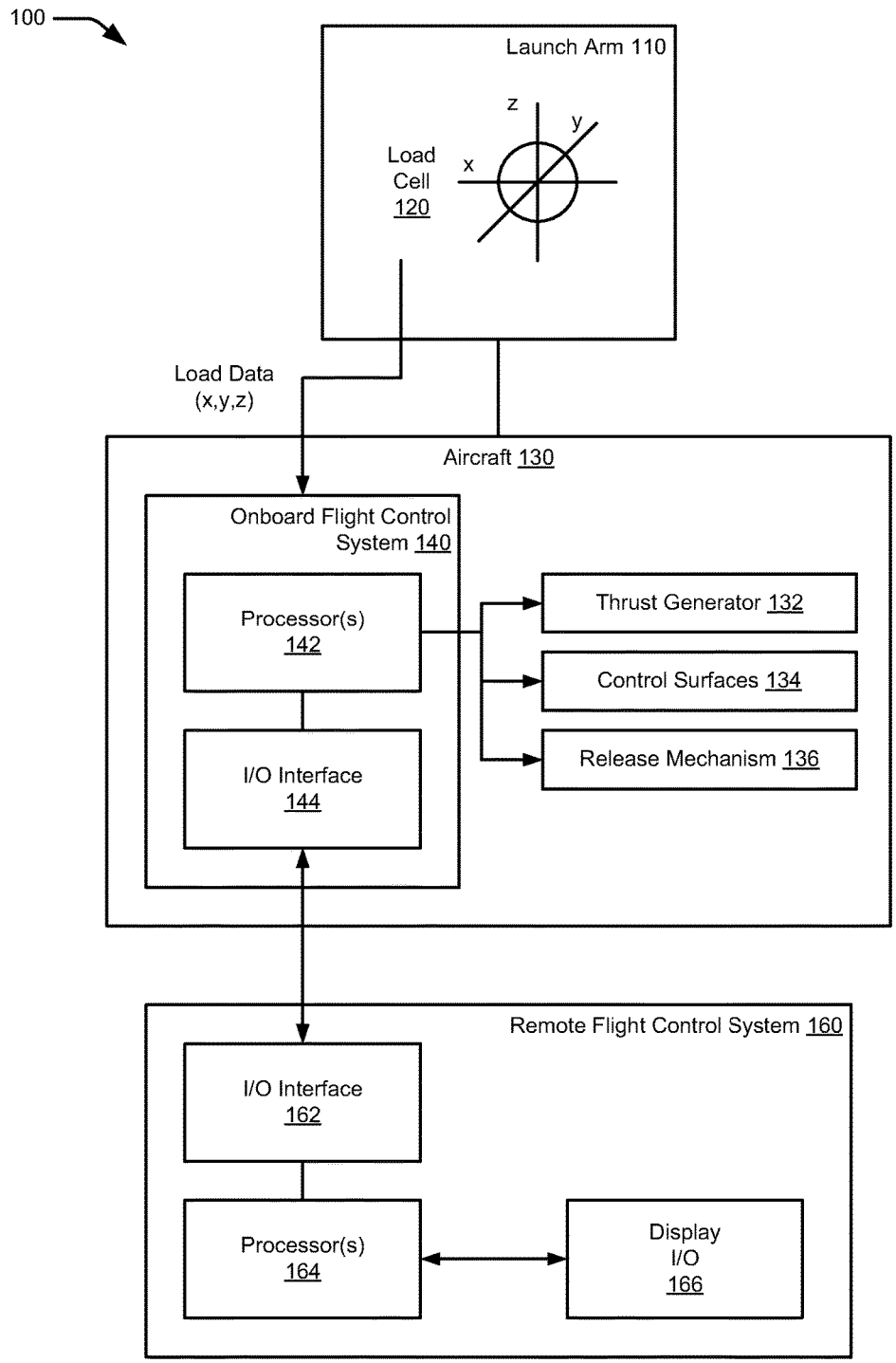
FIG. 1 is a schematic illustration of system to launch an aircraft, according to embodiments.

FIG. 1 is a schematic illustration of system to launch an aircraft, according to embodiments. Referring first to FIG. 1, in some embodiments a system 100 comprises a launch arm 110 coupled to an aircraft 130. Launch arm 110 comprises at least one load cell 120 capable of measuring a load on the launch arm 110. In some embodiments the load cell 120 generates load data in three dimensions, as indicated by the (x,y,z) axis depicted in FIG. 1.

In some embodiments aircraft 130 may comprise a thrust generator 132, e.g., a propeller or other engine, and one or more control surfaces 134 to generate a thrust vector for the aircraft. Aircraft 130 may further comprise a release mechanism 136 to release the aircraft 130 from the launch arm 110.

In some embodiments aircraft 130 comprises an onboard flight control system 140, which in turn may comprise one or more processor(s) 142, and an input/output interface 144. The onboard flight control system 140 may be communicatively coupled to a remote flight control system 160 via a suitable communication link. Remote flight control system 160 may comprise an I/O interface 162, one or more processors 164 and a display or other input/output mechanism 166.

By way of example, in some embodiments aircraft 130 may be embodied as a blimp, an airplane, a quad rotor device, an unmanned aerial vehicle, or other aerial vehicle which may be controlled via the remote flight control system 160 operated automatically or by an operator interfacing with a display or other input/output mechanism 166.

Figure 2:
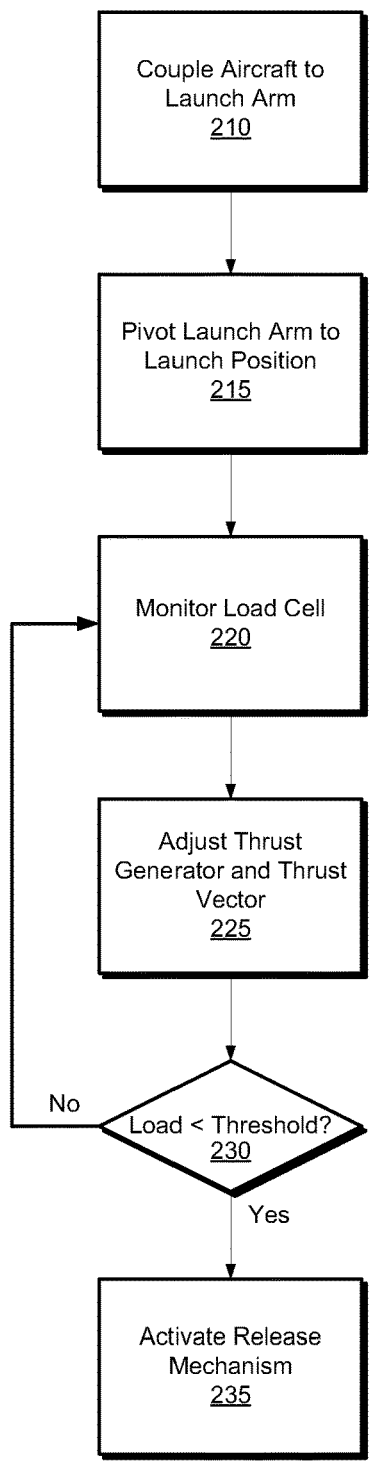
FIG. 2 is a flowchart illustrating operations in a method launch an aircraft, according to embodiments.

In some embodiments components of the system 100 cooperate to implement a method to launch the aircraft only when conditions are safe for a launch. FIG. 2 is a flowchart illustrating operations in a method launch an aircraft, according to embodiments, while FIGS. 3A-3E illustrate the system in various stages of operation.

Figure 3A:
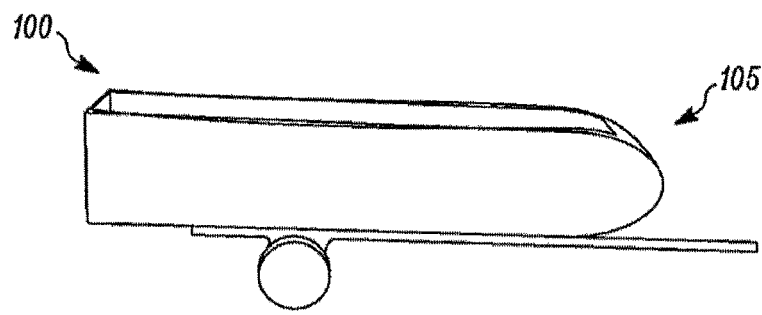
FIGS. 3A-3E are schematic illustrations of a system to launch an aircraft, according to embodiments.
Figure 3B:
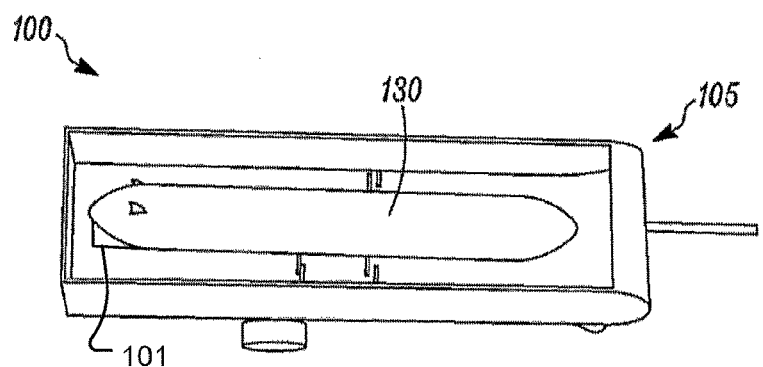

Referring to FIG. 2, at operation 210 an aircraft is coupled to the launch arm. Referring to FIG. 3A, in some embodiments the launch arm 110 and the aircraft 130 may be coupled to a mobile vehicle such as a trailer 105. When the aircraft is not in use the launch arm 110 and the aircraft may be stowed in the trailer 105 (FIG. 3B).

Figure 3C:
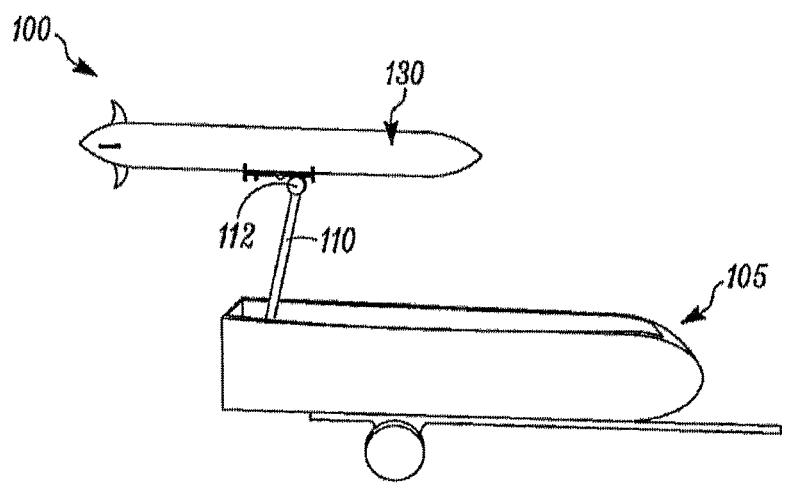
Figure 3D:
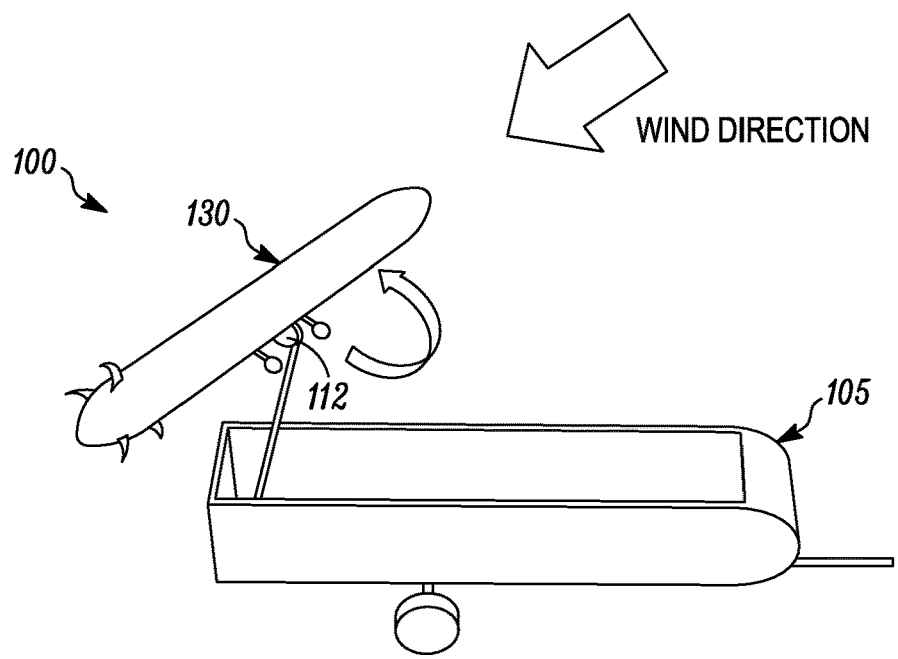

At operation 215 the launch arm 110 may be pivoted using rotatable 101 from a first position in which the launch arm is stowed, as depicted in FIG. 3A, to a second position in which the launch arm is deployed, as depicted in FIG. 3C. In some embodiments the launch arm 110 may comprise a head 112 which rotates and/or gimbals with respect to the launch arm 110 to allow the aircraft to rotate and to pitch or yaw on the launch arm 110 (FIG. 3D).

At operation 220 the load cell 120 is monitored to assess the load on the launch arm 110. By way of example, in some embodiments the onboard flight control system 140 receives load data from the load cell 120. In embodiments in which the aircraft 130 operates autonomously the one or more processor(s) 142 may evaluate the data on the aircraft 130 to determine a load on the launch arm 110. By contrast, in embodiments in which the aircraft 130 is controlled remotely the load data may be transmitted from the onboard flight control system 140 to a remote flight control system 160. The load data may be evaluated automatically by the processor(s) 164 or may be presented on a display or other input/output mechanism 166, e.g. a user interface, for evaluation by an operator.

At operation 225 the thrust generator 132 and one or more control surfaces 134 of the aircraft 130 may be adjusted to adjust the thrust vector of the aircraft. By way of example, in some embodiments the thrust vector may be adjusted to compensate for gravity, loads generated by wind blowing the aircraft 130, and/or other environmental factors. In embodiments in which the aircraft 130 operates autonomously the one or more processors 142 may adjust the thrust generator 132 and the control surfaces 134. By contrast, in embodiments in which the aircraft 130 is controlled remotely the thrust generator 132 and the control surfaces 134 may be controlled by the remote flight control system 160, either automatically or by an operator.

Figure 3E:
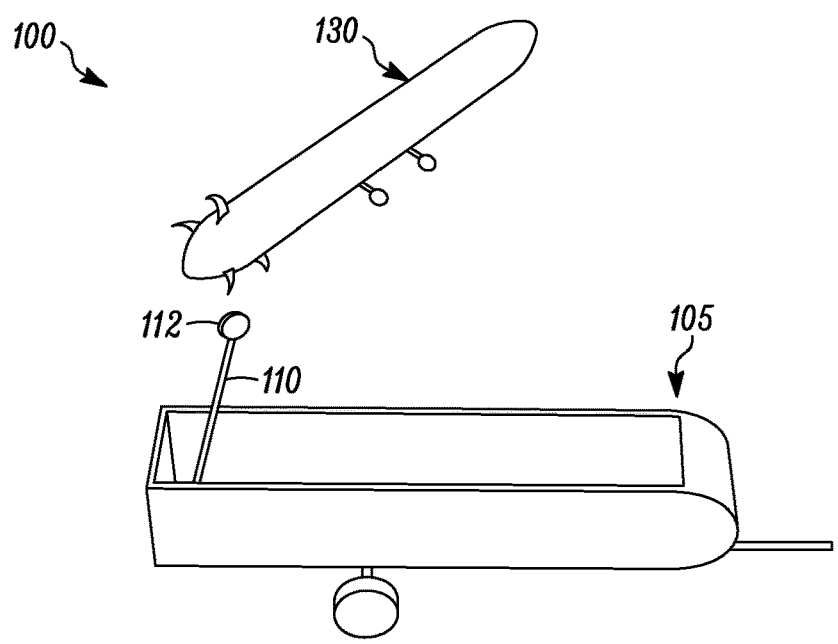

If, at operation 230, load data received from the load cell 120 indicates that the load on the launch arm exceeds a predetermined threshold then control passes back to operation 220 and the load data is monitored while the thrust is adjusted (operation 225). By contrast, if at operation 230 the load drops below a predetermined threshold then control passes to operation 235 and the release mechanism 136 is activated to release the aircraft 130 from the launch arm 110 (FIG. 3E).

In some embodiments the threshold for the load may be set at a level which indicates that the aircraft 130 can safely take off from the launch arm 110. By way of example, the load threshold may be set such that the aircraft 130 is released when the thrust vector substantially cancels out the load from gravity, wind conditions, and/or other environmental conditions operating on the aircraft. In other embodiments the threshold may be set such that the aircraft 130 is not released until the thrust vector provides upward lift for the aircraft 130.

While the release mechanism 136 had been described as being a component of the aircraft 130, in alternate embodiments the release mechanism 136 may be a component of the launch arm 110.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An apparatus comprising:
    a body comprising a stow compartment, the stow compartment configured to store an aircraft;
    a launch arm configured to couple to the aircraft, the launch arm comprising:
        a shaft including a first end and a second end;
        a rotatable joint coupling the first end of the shaft to a floor of the stow compartment, the rotatable joint configured to rotate the shaft relative to the floor between a stowed position and a launch position, wherein the stowed position corresponds to the aircraft being in the stow compartment, wherein the shaft is substantially parallel with the floor of the stow compartment while in the stowed position, and wherein the shaft is non-parallel with the floor while in the launch position;
        a load cell configured to:
            autonomously generate load data indicative of a load exerted on the launch arm by the aircraft; and
            autonomously transmit the load data to a processor device; and
        a head configured to couple the second end of the shaft to the aircraft, the head configured to gimbal, while the launch arm is in the launch position, with respect to the launch arm to allow the aircraft to rotate on the launch arm, to pitch on the launch arm, and to yaw on the launch arm; and
    a release mechanism configured to release the aircraft from the head based on an autonomous determination, by the processor device, whether the load indicated by the load data satisfies a load threshold, wherein the processor device is configured to:
        in response to the autonomous determination that the load fails to satisfy the load threshold, autonomously transmit a signal to a thrust generator to cause the thrust generator to adjust a thrust vector of the aircraft, wherein the thrust generator is configured to increase a thrust output in response to the signal; and
        in response to the autonomous determination that the load satisfies the load threshold, autonomously cause a release of the aircraft from the head of the launch arm.

2. The apparatus of claim 1, wherein the launch arm is configured to position a roll axis of the aircraft substantially parallel with the floor of the stow compartment while the shaft is in the stowed position, and wherein the launch arm is configured to position the roll axis of the aircraft to be non-parallel with the shaft while the shaft is in the launch position.

3. The apparatus of claim 2, wherein the launch arm is configured to position the roll axis of the aircraft to be non-parallel with the floor while the shaft is in the launch position.

4. The apparatus of claim 1, wherein the head is configured to position a roll axis of the aircraft to be parallel with a wind direction while the shaft is in the launch position.

5. The apparatus of claim 1, wherein the stow compartment comprises a plurality of walls, each wall of the plurality of walls having a height larger than a height of the aircraft.

6. The apparatus of claim 5, wherein a first wall of the plurality of walls is configured to be parallel with a roll axis of the aircraft while the shaft is in the stow position, and wherein the first wall has a first length greater than a second length of a portion of the aircraft corresponding to the roll axis.

7. The apparatus of claim 6, wherein a second wall of the plurality of walls is configured to be perpendicular with the roll axis while the shaft is in the stow position, and wherein the second wall has a third length greater than a fourth length of a second side of the aircraft, the second side non-parallel with the first side.

8. The apparatus of claim 1, wherein the body comprises a mobile vehicle.

9. The apparatus of claim 8, wherein the mobile vehicle is configured to be pulled by a second mobile vehicle distinct from the mobile vehicle.

10. A system comprising:
a mobile vehicle comprising:
a first body comprising a stow compartment;
a launch arm comprising:
a shaft including a first end and a second end;
a rotatable joint coupling the first end of the shaft to a floor of the stow compartment, the rotatable joint configured to rotate the shaft relative to the floor between a stowed position and a launch position, wherein the shaft is substantially parallel with the floor of the stow compartment while in the stowed position, and wherein the shaft is non-parallel with the floor while in the launch position;
a load cell configured to:
autonomously generate load data indicative of a load exerted on the launch arm; and
autonomously transmit the load data to a processor device; and
a head coupled to the second end of the shaft; and
an aircraft coupled to the launch arm via the head, wherein the stowed position corresponds to the aircraft being in the stow compartment, the aircraft comprising:
a second body configured to couple to the launch arm;
a thrust generator configured to generate a force on the second body; and
the processor device communicatively coupled to the load cell, the processor device configured to:
determine, autonomously, whether the load indicated by the load data satisfies a load threshold; and
transmit, autonomously, a signal:
in response to a determination that the load indicated by the load data fails to satisfy the load threshold, to the thrust generator to cause the thrust generator to adjust a thrust vector of the second body; and
in response to a determination that the load indicated by the load data satisfies the load threshold, to a release mechanism to release the second body from the head, wherein the head is configured to couple an end of the launch arm to the aircraft, and wherein the head is configured to, while the launch arm is in a launch position, gimbal with respect to the launch arm to allow the aircraft to rotate on the launch arm, to pitch on the launch arm, and to yaw on the launch arm.

11. The system of claim 10, wherein the processor device is configured to communicate with a remote flight control system, wherein the remote flight control system is remote from the aircraft, and wherein the processor device is further configured to generate the signal in response to an input received from the remote flight control system, the input received in response to the load indicated by the load data not satisfying the load threshold.

12. The system of claim 10, wherein the aircraft is coupled to the launch arm via a connector on a side of the aircraft facing the floor while the aircraft is couple to the launch arm.

13. The system of claim 10, wherein, in response to the signal, the thrust generator is configured to increase a thrust output or adjust the thrust vector to compensate for at least one of gravity, wind force upon the aircraft, or environmental factors.

14. A method comprising:
initiating rotation of an aircraft by rotating a single shaft of a launch arm relative to a mobile vehicle, the single shaft including a first end connected to a surface of the mobile vehicle by a rotatable joint and a second end connected to a head, the head coupled to the aircraft and configured to gimbal, while the launch arm is in a launch position, with respect to the launch arm to allow the aircraft to rotate and to pitch or yaw on the launch arm, wherein rotating the single shaft moves the aircraft from a stowed position to a launch position, wherein the stowed position corresponds to the aircraft being in a stow compartment of the mobile vehicle, wherein the single shaft is substantially parallel with a floor of the stow compartment while in the stowed position, and wherein the single shaft is non-parallel with the floor while in the launch position;
determining load data indicative of a load exerted on the launch arm by the aircraft at a load cell coupled to the launch arm;
receiving a first signal from a flight control system indicating whether the load satisfies a load threshold at a first time responsive to transmitting the load data to a processor device of the flight control system;
responsive to the first signal indicating that the load fails to satisfy the load threshold, autonomously transmitting, by the processor device of the flight control system, a second signal to a thrust generator of the aircraft to cause the thrust generator to adjust a thrust vector of the aircraft;
receiving a second signal from a flight control system indicating whether the load satisfies the load threshold at a second time;
responsive to the second signal indicating that the load satisfies the load threshold, autonomously activating, by the processor device of the flight control system, a release mechanism that is coupling the aircraft to the head while the second signal is received; and
releasing, by the release mechanism, the aircraft from the launch arm in response to the activation.

15. The method of claim 14, wherein the load threshold corresponds to the load exerted on the launch arm by the aircraft being less than or equal to zero.

16. The method of claim 14, wherein the load data comprises three-dimensional load data.

17. The method of claim 14, wherein the flight control system is onboard the aircraft.

18. The method of claim 14, wherein the aircraft comprises a blimp or a quad-rotor.

19. The method of claim 14, wherein the load threshold indicates that the aircraft is generating force sufficient for the aircraft to have upward lift in a direction away from a top surface of a stow compartment of the mobile vehicle.

20. The method of claim 14, wherein the flight control system is remote from the aircraft.

* * * * *

UNITED STATES PATENT AND TRADEMARK OFFICE
CERTIFICATE OF CORRECTION

PATENT NO.         : 10,377,481 B2
APPLICATION NO.    : 13/662269
DATED              : August 13, 2019
INVENTOR(S)        : James J. Childress and Daniel J. Perron Page 1 of 1

It is certified that error appears in the above-identified patent and that said Letters Patent is hereby corrected as shown below:

In the Specification

Column 2, Line 66, "rotatable 101" should read --rotatable joint 101--.

Signed and Sealed this
Eighth Day of October, 2019

Andrei Iancu
*Director of the United States Patent and Trademark Office*